United States Patent
Kim et al.

(10) Patent No.: US 12,058,763 B2
(45) Date of Patent: Aug. 6, 2024

(54) SIGNAL TRANSMISSION AND RECEPTION METHOD BY SMF IN WIRELESS COMMUNICATION SYSTEM AND DEVICE THEREFOR

(71) Applicant: LG ELECTRONICS INC., Seoul (KR)

(72) Inventors: Laeyoung Kim, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/970,769

(22) PCT Filed: Feb. 15, 2019

(86) PCT No.: PCT/KR2019/001881
§ 371 (c)(1),
(2) Date: Aug. 18, 2020

(87) PCT Pub. No.: WO2019/160377
PCT Pub. Date: Aug. 22, 2019

(65) Prior Publication Data
US 2021/0368576 A1    Nov. 25, 2021

Related U.S. Application Data

(60) Provisional application No. 62/631,907, filed on Feb. 18, 2018.

(51) Int. Cl.
*H04W 76/25* (2018.01)
*H04W 8/08* (2009.01)
*H04W 68/00* (2009.01)

(52) U.S. Cl.
CPC ............ *H04W 76/25* (2018.02); *H04W 8/08* (2013.01); *H04W 68/005* (2013.01)

(58) Field of Classification Search
CPC ...... H04W 76/25; H04W 8/08; H04W 68/005; H04W 60/04; H04W 76/12; H04W 74/08; H04L 9/40
See application file for complete search history.

(56) References Cited

U.S. PATENT DOCUMENTS

2017/0339609 A1    11/2017  Youn et al.
2018/0227743 A1*    8/2018  Faccin .................... H04W 8/08
(Continued)

FOREIGN PATENT DOCUMENTS

WO    2017142362    8/2017
WO    2018006017    1/2018

OTHER PUBLICATIONS

LG Electronics, "Clarification on UP activation for non-3GPP PDU Session related to DL data," S2-180552, 3GPP TSG-SA WG2 Meeting #125, Gothenburg, Sweden, Jan. 16, 2018, see section 4.2.3.3; and figure 4.2.3.3-1.
(Continued)

*Primary Examiner* — Peter P Chau
(74) *Attorney, Agent, or Firm* — BRYAN CAVE LEIGHTON PAISNER LLP

(57) ABSTRACT

A signal transmission and reception method by a session management function (SMF) in a wireless communication system according to an embodiment of the present invention comprises the steps of: the SMF determining whether or not a protocol data unit (PDU) session is to be activated; and the SMF transmitting a message comprising a session management (SM) message to an access and mobility management function (AMF). The PDU session is a PDU session which should be activated by means of a user equipment (UE) which received the SM message. The message comprising the SM message comprises information for activating the PDU session by means of the AMF.

6 Claims, 9 Drawing Sheets

(56) References Cited

U.S. PATENT DOCUMENTS

| | | | |
|---|---|---|---|
| 2019/0166647 A1* | 5/2019 | Velev | H04W 8/08 |
| 2020/0084675 A1* | 3/2020 | Lu | H04W 80/10 |
| 2020/0280948 A1* | 9/2020 | Youn | H04W 60/005 |
| 2020/0305211 A1* | 9/2020 | Foti | H04M 15/66 |

OTHER PUBLICATIONS

Vodafone, "Service Request procedure and near-simultaneous multiple PDN activation," S2-180635, SA WG2 Meeting #S2-125, Gothenburg, Sweden, Jan. 16, 2018, see section 4.2.3.2.

\* cited by examiner

SIGNAL TRANSMISSION AND RECEPTION METHOD BY SMF IN WIRELESS COMMUNICATION SYSTEM AND DEVICE THEREFOR

This application is the National Stage filing under 35 U.S.C. 371 of International Application No. PCT/KR2019/001881 filed Feb. 15, 2019, which claims the benefit of U.S. Provisional Application No. 62/631,907 filed Feb. 18, 2018, the contents of which are all hereby incorporated by reference herein in their entirety.

TECHNICAL FIELD

The present disclosure relates to a wireless communication system and, more particularly, to a method of efficiently processing downlink signaling that causes user plane activation of a protocol data unit (PDU) session and device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

DISCLOSURE

Technical Problem

The object of the present disclosure is to provide a method of efficiently processing downlink signaling that causes user plane activation of a protocol data unit (PDU) session.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a signal transmission and reception method for a session management function (SMF) in a wireless communication system. The method may include: determining, by the SMF, whether a protocol data unit (PDU) session is to be activated; and transmitting, by the SMF, a message including a session management (SM) message to an access and mobility management function (AMF). The PDU session may need to be activated by a user equipment (UE) receiving the SM message, and the message including the SM message may include information for the AMF to activate the PDU session.

In another aspect of the present disclosure, provided is an SMF device in a wireless communication system. The SMF device may include: a memory; and at least one processor coupled to the memory. The at least one processor may be configured to control the SMF device to determine whether a PDU session is to be activated and control the SMF device to transmit a message including an SM message to an AMF. The PDU session may need to be activated by a UE receiving the SM message, and the message including the SM message may include information for the AMF to activate the PDU session.

The information for activating the PDU session may be used by the AMF to activate the PDU session.

When the AMF activates the PDU session, the UE receiving the SM message may not perform the activation.

The PDU session may be deactivated before the SMF transmits the message including the SM message.

The SM message may include a new proxy-call session control function (P-CSCF) list.

The message including the SM message may be a Namf_Communication_N1N2MessageTransfer message.

The SM message may be a PDU Session Modification Command message.

The message including the SM message may further include information for informing that both NAS message transmission to the UE and the activation of the PDU session are to be performed.

The SM message may further include information for informing that the UE does not need to activate the PDU session.

The activation of the PDU session may be that an N3 tunnel between a fifth generation access network (5G-AN) and a user plane function (UPF) and a user plane for a radio section between the 5G-AN and the UE are activated.

Advantageous Effects

According to the present disclosure, a user equipment (UE) receiving a session management (SM) message may not need to activate a protocol data unit (PDU) session before performing an IP multimedia subsystem (IMS) registration. In addition, the UE may not need to perform a Service Request procedure for each PDU session.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the disclosure.

BEST MODE

Figure 1:
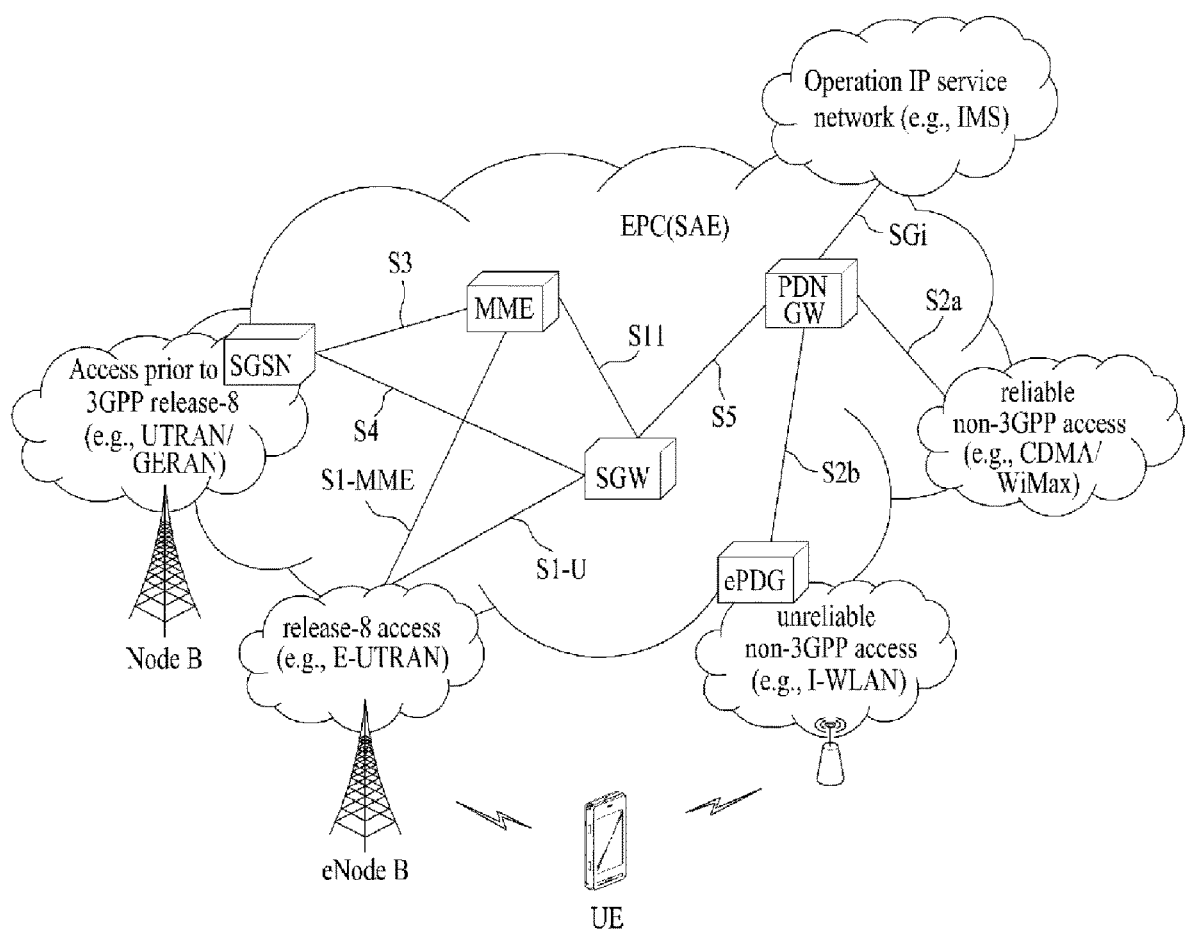
FIG. 1 is a schematic diagram illustrating the structure of an evolved packet system (EPS) including an evolved packet core (EPC).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2*a* and S2*b* correspond to non-3GPP interfaces. S2*a* is a reference point which provides reliable non-3GPP access and related control and mobility support between PDN GWs to a user plane. S2*b* is a reference point which provides related control and mobility support between the ePDG and the PDN GW to the user plane.

Figure 2:
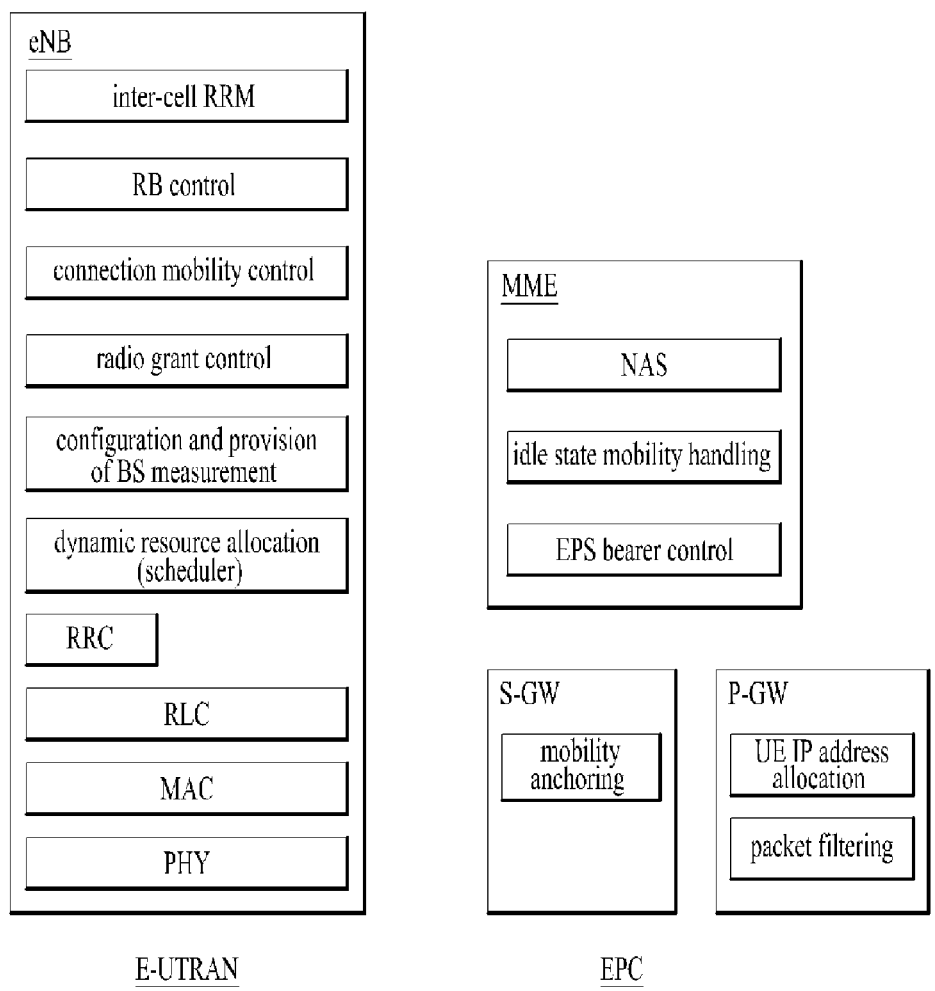
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
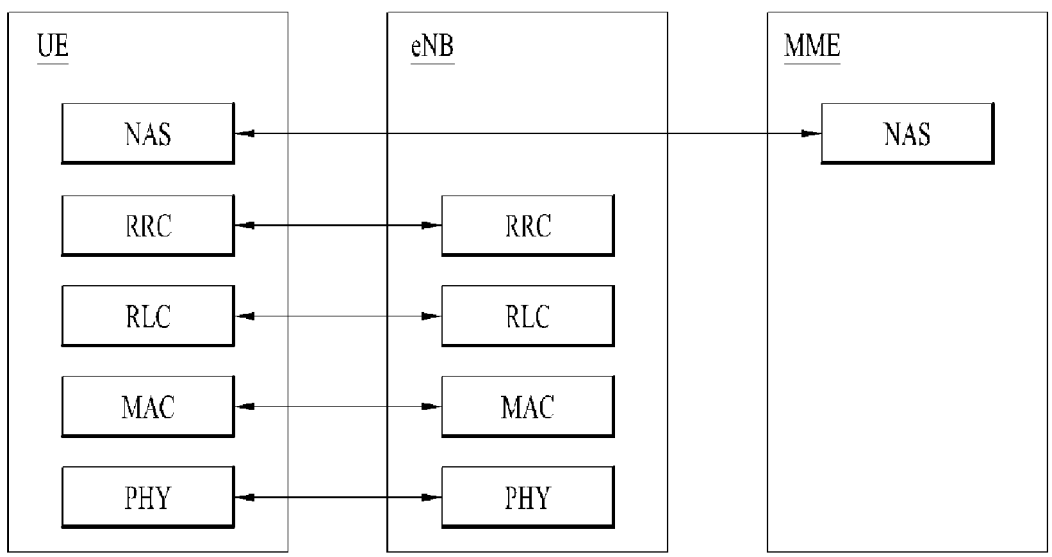
FIG. 3 is a diagram illustrating the structure of a radio interface protocol in a control plane.
Figure 4:
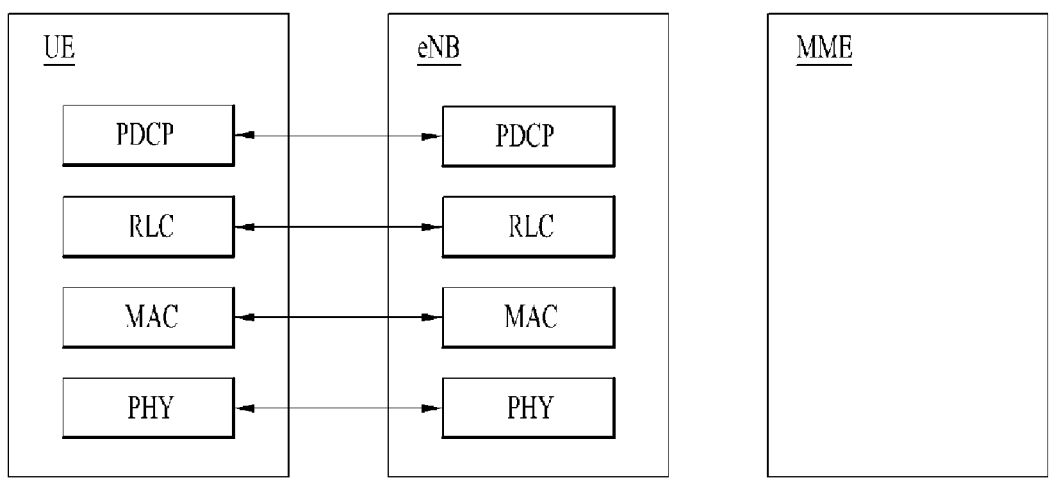
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
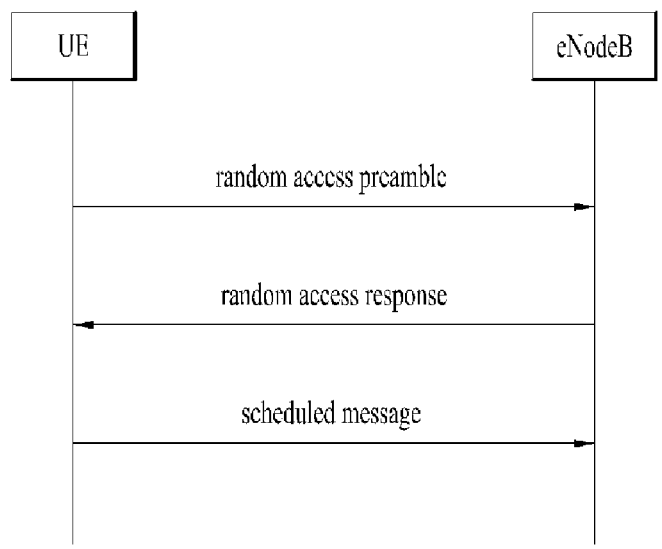
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
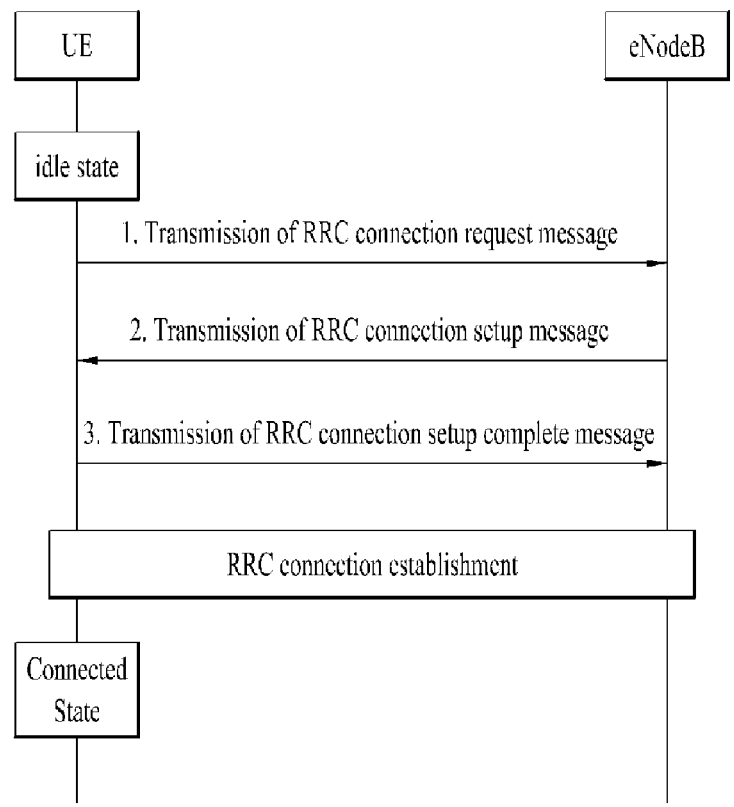
FIG. 6 is a diagram illustrating a connection process in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.
2) Upon receiving the RRC connection request message from the UE, the ENB accepts the RRC connection request of the UE when the radio resources are sufficient, and then transmits an RRC connection setup message, which is a response message, to the UE.
3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
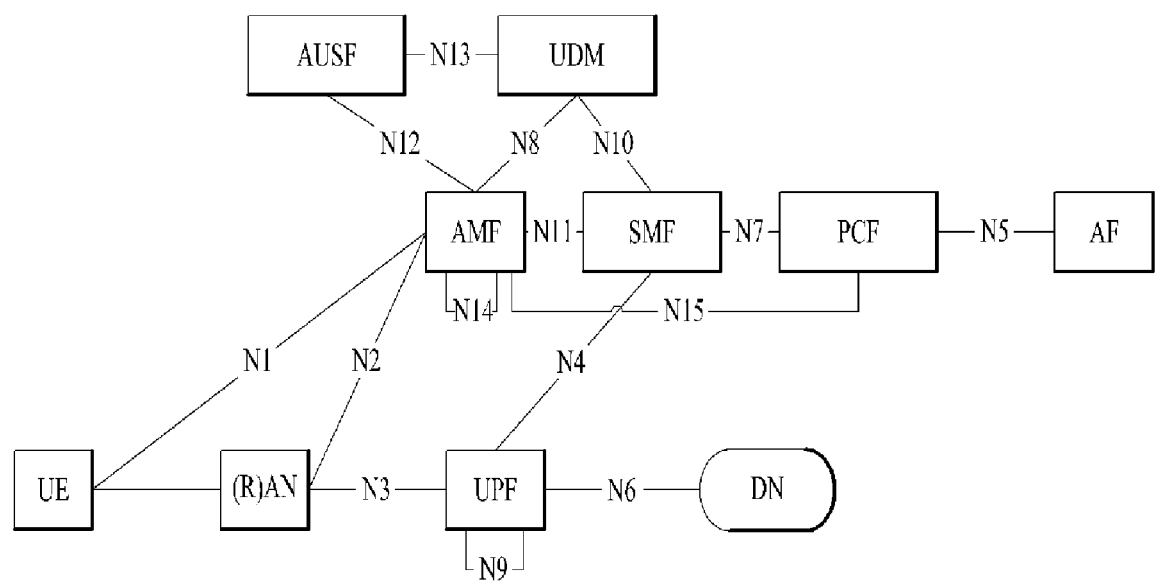
FIG. 7 is a diagram illustrating a fifth generation (5G) system.

In the next generation system (or fifth generation (5G) core network (CN)), an MME in the legacy EPC is divided into an access and mobility management function (AMF) and a session management function (SMF). The AMF is in charge of NAS interaction with a UE and mobility management (MM), and the SMF is in charge of session management (SM). In addition, the SMF manages a user plane function (UPF), which is a gateway for routing user traffic, i.e., managing a user plane. This may be interpreted to mean that the SMF manages the control plane of an S-GW and P-GW in the legacy EPC and the UPF manages the user plane thereof. For user traffic routing, at least one UPF may exist between a RAN and a data network (DN). That is, in the 5G system, the legacy EPC may be implemented as illustrated in FIG. 7. The 5G system defines a protocol data unit (PDU) session as the concept related to a PDN connection in the legacy EPS. The PDU session refers to association between the UE and the DN that provides PDU connectivity services, and there are an IP type PDU session, Ethernet type PDU session, and unstructured type PDU session. Additionally, a unified data management (UDM) serves as an HSS in the EPC, and a policy control function (PCF) serves as a policy and charging rules function (PCRF) in the EPC. To satisfy the requirements of the 5G system, these functions may be extended and provided. The details of the 5G system architecture, individual functions, and individual interfaces may be found in TS 23.501.

The details of the 5G system are specified in TS 23.501, TS 23.502, and TS 23.503. Thus, the present disclosure assumes that relevant standards are applied to the 5G system. In addition, the architecture of a next generation radio access network (NG-RAN) and the details thereof are specified in TS 38.300. The 5G system supports non-3GPP accesses. The details of architectures, network elements, etc. for supporting the non-3GPP accesses are specified in clause 4.2.8 of TS 23.501, and the details of procedures for supporting the non-3GPP accesses are specified in clause 4.12 of TS 23.502. A wireless local area network (WLAN) access may be considered as a representative example of the non-3GPP access, and the WLAN access may include both a trusted WLAN and an untrusted WLAN. In the 5G system, the AMF may perform registration management (RM) and connection management (CM) for the non-3GPP accesses as well as 3GPP accesses. When the same AMF serves UEs for the 3GPP and non-3GPP accesses included in the same PLMN, a single network function may support the authentication, MM, SM, etc. for a UE registered over two difference accesses comprehensively and efficiently.

Figure 8:
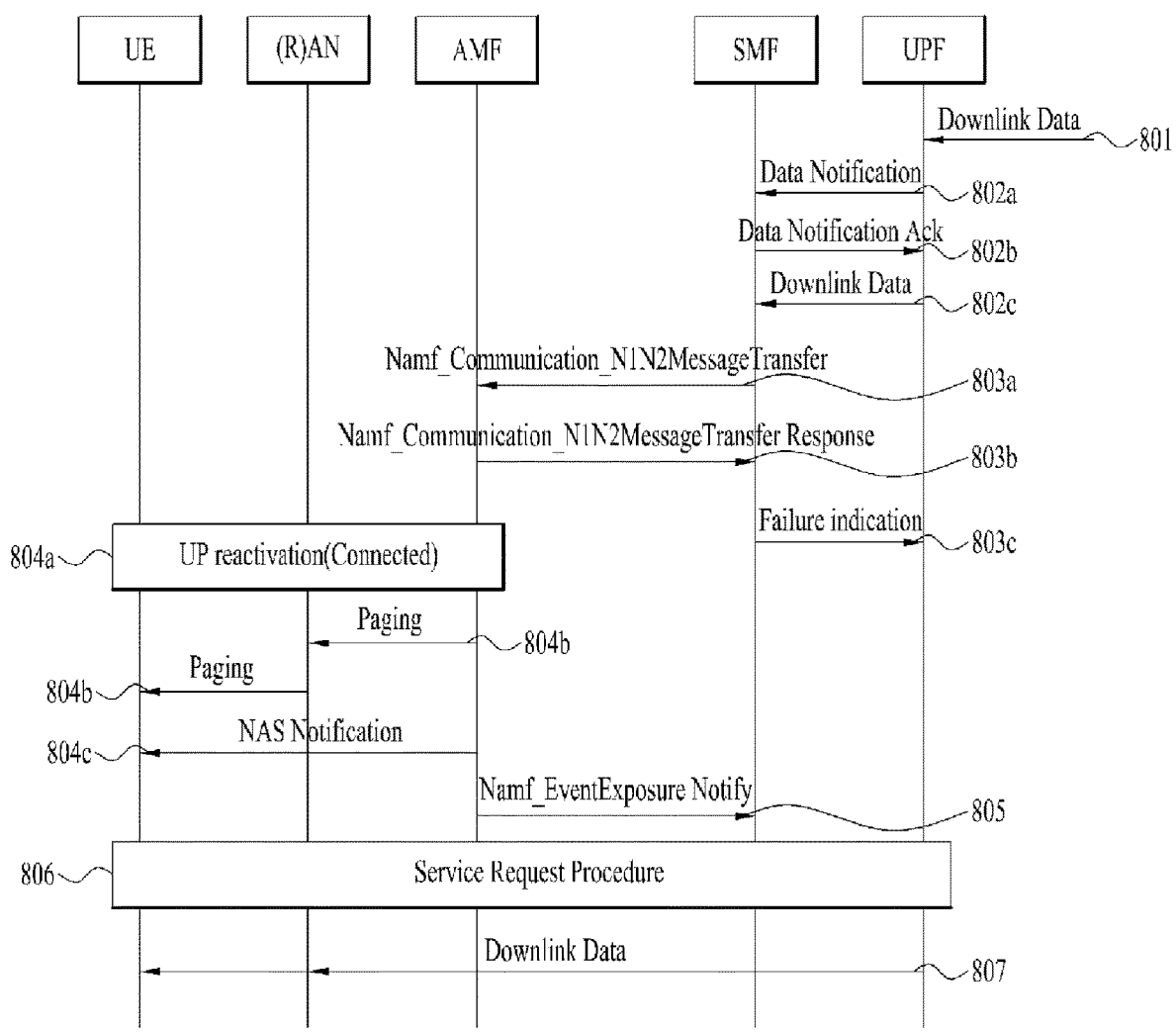
FIG. 8 is a diagram illustrating an embodiment of the present disclosure.

In clause 4.2.3.4. of TS 23.502, described is how the UE operates when there is downlink data (or downlink traffic) of a PDU session associated with the non-3GPP access on the assumption that the UE is registered over both the 3GPP and non-3GPP accesses in the same PLMN and the UE is in the CM-IDLE state in the non-3GPP access. Specifically, in this case, if the 3GPP access is CM-IDLE, the AMF may page the UE over the 3GPP access (see step 4*b* of clause 4.2.3.3 of TS 23.502). On the contrary, if the 3GPP access is CM-CONNECTED, the AMF may transmit a NAS Notification message to the UE over the 3GPP access (see step 4*c* of clause 4.2.3.3 of TS 23.502). FIG. 8 illustrates a Network Triggered Service Request procedure of clause 4.2.3.3 of TS 23.502, and the details thereof may be found in clause 4.2.3.3 of TS 23.502.

It is unclear that the UE performs paging or NAS Notification message transmission over the 3GPP access when there is downlink signaling for a PDU session associated with the non-3GPP access (hereinafter referred to as a non-3GPP PDU session) in the same manner as the occurrence of downlink data when the non-3GPP access is CM-IDLE. However, it may be considered that the downlink signaling for the non-3GPP PDU session is provided to the UE over the 3GPP access in the same way as the downlink data for the non-3GPP PDU session. For example, downlink signals related to the PDU session may include a PDU Session Modification Command/Request message, a PDU Session Release Command/Request message, etc.

In particular, regarding session modification, the SMF performs a PDU Session Modification procedure to provide a new proxy-call session control function (P-CSCF) list (i.e., a new list of P-CSCF addresses) due to P-CSCF failure on the IP multimedia subsystem (IMS). The details of a P-CSCF Restoration procedure in 5G are described in clause 5.8 of TS 23.380, and the P-CSCF Restoration procedure is referred to as the prior art of the present disclosure.

In the 5G system (5GS), it is not necessary to activate the user plane for all generated PDU sessions even though the UE enters the CM-CONNECTED state. In other words, only the user plane for a PDU session that needs to be used (or a PDU session in which data is generated) may be selectively activated (see clause 5.6.8 of TS 23.501, Selective activation and deactivation of UP connection of existing PDU session) (Hereinafter, activation of the user plane for a PDU session may refer to activation of a user plane connection for the PDU session, N3 activation for the PDU session, N3 tunnel activation for the PDU session, and activation of the PDU session. In addition, deactivation of the user plane for a PDU session may refer to deactivation of a user plane connection for the PDU session, N3 deactivation for the PDU session, N3 tunnel deactivation for the PDU session, and deactivation of the PDU session).

To provide the new P-CSCF list (i.e., new list of P-CSCF addresses) to the UE in the 5GS, the SMF may perform the PDU Session Modification procedure as follows. First, a case in which the UE is in the CM-IDLE state will be described. The SMF transmits to the AMF a Namf_Communication_N1N2MessageTransfer message including a PDU Session Modification Command message, where the PDU Session Modification Command message includes the new P-CSCF list. In this case, since the Namf_Communication_N1N2MessageTransfer message is not for downlink data, the message does not contain N2 SM information for activating the user plane of the corresponding PDU session, i.e., information used by a 5G access network (5G-AN) to activate the user plane of the PDU session. In other words, the message includes only an N1 SM container including the PDU Session Modification Command message to be transmitted to the UE. The AMF pages the UE, and the UE initiates a Service Request procedure by responding the paging. The AMF transmits the PDU Session Modification Command message to the UE, and the UE transmits a PDU Session Modification Command Ack message through the AMF to the SMF. The UE needs to perform an IMS registration through a new P-CSCF based on the received new P-CSCF list. Thus, the UE performs the Service Request procedure towards the AMF to activate the user plane for the PDU session. The AMF performs an operation for activating the user plane of the corresponding PDU session through interaction with the SMF and 5G-AN. The UE performs the IMS registration. When the UE is in the CM-CONNECTED state, the paging operation is not performed.

When an IMS PDU session (i.e., a PDU session in which the IMS is a data network name (DDN)) is deactivated, if the UE receives the new P-CSCF list, the UE needs to activate the PDU session first in order to perform the IMS registration. In addition, in the 5GS, since activation is performed for each PDU session, the Service Request procedure is also performed for each PDU session. These operations may be inconvenient and inefficient. To solve such problems, the present disclosure proposes a method of efficiently processing downlink signaling causing the user plane activation of a PDU session in 3GPP 5G systems (e.g., 5G mobile communication system, future generation mobile communication system, next generation mobile communication system, NG mobile communication system, etc.). The proposed method may be normally/generally applied when downlink signaling resulting in the user plane activation of a deactivated PDU session (downlink signaling followed by the user plane activation) is transmitted.

Embodiment 1

The first embodiment will be described with reference to FIG. 8. In the embodiments of the present disclosure, all steps of the Network Triggered Service Request procedure illustrated in FIG. 8 may not need to be performed. For example, Embodiment 1 may start at step 803a.

The SMF may determine whether a PDU session will be activated. Specifically, the SMF determines whether the corresponding PDU session will be activated based on an SM message (e.g., PDU Session Modification Command message) transmitted to the UE. As an example of satisfying this condition, a case in which a new P-CSCF list is provided to the UE to solve P-CSCF failure may be considered. Here, the SM message may include the new P-CSCF list.

Additionally and/or alternatively, the SMF determines whether the PDU session is deactivated (i.e., whether the PDU session is deactivated before the SMF transmits a message including the SM message) (it is premised that when a specific PDU session is activated, the SMF stores this state).

The SMF transmits to the AMF the message including the SM message (e.g., a Namf_Communication_N1N2MessageTransfer message) (step 803a).

When the above condition(s) are satisfied, the SMF includes information for activating the user plane of the PDU session in the message to be transmitted to the AMF, i.e., the Namf_Communication_N1N2MessageTransfer message. That is, the PDU session needs to be activated by the UE that receives the SM message, and the message including the SM message includes the information for the AMF to activate the PDU session. The information for the AMF to activate the PDU session is used by the AMF to activate the PDU session. When the AMF activates the PDU session, the UE receiving the SM message performs no activation. Thus, this operation is efficient in that the UE receiving the SM message does not need to activate the PDU session first before performing an IMS registration. In addition, it is also efficient in that the Service Request procedure may not need to be performed for each PDU session.

When the above condition(s) are satisfied, the message including the SM message may further include information for informing that both NAS message transmission to the UE and the activation of the PDU session are to be performed.

When the above condition(s) are satisfied, the SM message may further include information indicating that the UE does not need to activate the PDU session (or information indicating that the network will activate the PDU session or information indicating that the PDU session will be activated).

The activation of the PDU session may mean that the N3 tunnel between the 5G-AN and UPF and the user plane of the radio section between the 5G-AN and UE are activated. The information for activating the user plane may be in the form of N2 SM information, and it may include various information for activating the N3 tunnel, for example, QFI(s), QoS profile(s), CN N3 Tunnel Info, S-NSSAI, Paging Policy Indication, etc.

Hereinafter, how the UE operates depending on RRC connection states after the AMF receives the message including the SM message will be described.

If the UE is in the CM-CONNECTED state (step 804a), the AMF transmits the SM message to the UE based on the message/information received in step 803a and performs an operation for activating the corresponding PDU session. The UE may know that the PDU session is activated from an RRC connection reconfiguration procedure from the NG-RAN. The UE sends a response for the SM message. Thereafter, data/traffic may be transmitted over the activated PDU session. For example, if the UE receives the new P-CSCF list in the SM message, the UE may send the response for the SM message and immediately perform the IMS registration. In other words, the UE may not need to perform the Service Request procedure separately to activate an IMS PDU session.

If the UE is in the CM-IDLE state, the AMF pages the UE based on the message/information received in step 803a. Then, the UE performs the Service Request procedure in response to the paging. The AMF transmits the SM message to the UE and performs the operation of activating the corresponding PDU session. The UE sends the response for the SM message. Thereafter, data/traffic may be transmitted over the activated PDU session. For example, if the UE receives the new P-CSCF list in the SM message, the UE may send the response for the SM message and immediately perform the IMS registration. In other words, the UE may not need to perform the Service Request procedure separately to activate the IMS PDU session.

The AMF may be capable of transmitting the SM message to the UE after the UE performs the Service Request procedure upon receiving a NAS Notification message from the AMF. In this case, the description regarding the CM-CONNECTED state may be referred to from the point that the SM message is transmitted to the UE.

Embodiment 2

The SMF may determine whether a PDU session will be activated. Specifically, the SMF determines whether the corresponding PDU session will be activated (that is, whether there is follow-up user place activation) based on an SM message (e.g., PDU Session Modification Command message) transmitted to the UE. As a relevant example, a case in which a new P-CSCF list is provided to the UE to solve P-CSCF failure may be considered. Here, the SM message may include the new P-CSCF list.

Additionally and/or alternatively, the SMF determines whether the PDU session is deactivated (i.e., whether the PDU session is deactivated before the SMF transmits a message including the SM message) (it is premised that when a specific PDU session is activated, the SMF stores this state).

The SMF transmits to the AMF the message including the SM message (e.g., a Namf_Communication_N1N2MessageTransfer message).

When the above conditions are satisfied, the SMF may include as additional information (i.e., information to be transmitted to the UE) information indicating that the UE needs to activate the PDU session in the SM message included in Namf_Communication_N1N2MessageTransfer.

Hereinafter, how the UE operates depending on RRC connected states upon receiving the information indicating that the PDU session needs to be activated will be described.

If the UE is in the CM-CONNECTED state, the AMF transmits the SM message to the UE based on the message/information received in step 803a. The UE sends a response for the SM message. In this case, the UE includes information for requesting to activate the corresponding PDU session in the response for the SM message based on at least one piece of the following information.

Information included in the received SM message, i.e., information indicating that the UE needs to activate the PDU session as described in step 803a Information about whether the PDU session needs to be used based on the received SM message Information about whether the PDU session needs to be activated based on the received SM message and the deactivation state of the PDU session Upon receiving the SM message, the SMF sends to the AMF a request for activating the user plane of the PDU session (by transmitting N2 SM information). The AMF performs the PDU session activation operation with the 5G-AN, and the 5G-AN performs the PDU session activation operation with the UE. Thereafter, the UE may transmit data/traffic over the activated PDU session.

The information for requesting the activation of the PDU session may be included in a message checked by the AMF, instead of being included in a message checked by the SMF. In this case, the AMF may inform the SMF that the corresponding PDU session needs to be activated. Accordingly, the AMF may perform the PDU session activation operation by receiving the N2 SM information from the SMF. For example, if the UE receives the new P-CSCF list in the SM message, the UE may send the response for the SM message by including the information for requesting the activation of the corresponding PDU session. When the PDU session is activated, the UE may perform an IMS registration. In other words, the UE may not need to perform the Service Request procedure separately to activate an IMS PDU session.

If the UE is in the CM-IDLE state, the AMF the AMF pages the UE based on the message/information received in step 803a. Then, the UE performs the Service Request procedure in response to the paging. The details described in step 804a may be applied starting from the point that the AMF transmit the SM message to the UE to the follow-up operations.

The AMF may be capable of transmitting the SM message to the UE after the UE performs the Service Request procedure upon receiving a NAS Notification message from the AMF. In this case, the details described in step 804a may be applied starting from the point that the AMF transmit the SM message to the UE to the follow-up operations.

Overview of Device to which the Present Disclosure Is Applicable

Figure 9:
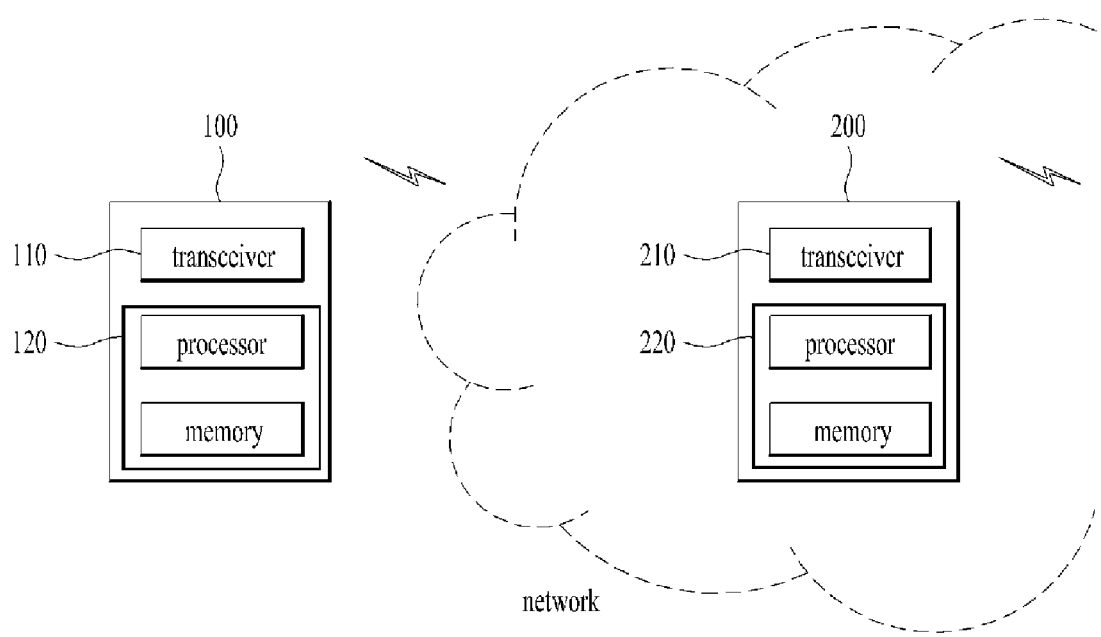
FIG. 9 is a diagram illustrating the configurations of node devices according to an embodiment of the present disclosure.

FIG. 9 is a diagram illustrating the configurations a UE device and a network node device according to preferred embodiments of the present disclosure.

Referring to FIG. 9, a network node device 200 according to the present disclosure may include a transceiver 210 and a device 220 for a wireless communication system. The device 220 for the wireless communication system may include a memory and at least one processor coupled to the memory. The transceiver 210 may be configured to transmit various signals, data, and information to an external device and receive various signals, data, and information from the external device. The network node device 200 may be connected to the external device by wire and/or wirelessly. The at least one processor may be configured to control the overall operation of the network node device 200 and process information exchanged between the network node device 200 and the external device. The memory may be configured to store the processed information for a predetermined time and may be replaced with a component such as a buffer (not shown in the drawing). In addition, the processor may be configured to perform the operations of network nodes proposed in the present disclosure.

Specifically, the at least one processor may be configured to control an SMF to determine whether a PDU session is to be activated and control the SMF to transmit a message including an SM message to an AMF. The PDU session needs to be activated by a UE that receives the SM message. The message including the SM message may include information for the AMF to activate the PDU session.

Referring to FIG. 9, a UE device 100 according to the present disclosure may include a transceiver 110 and a device 120 for a wireless communication system. The device 120 for the wireless communication system may include a memory and at least one processor coupled to the memory. The transceiver 110 may be configured to transmit various signals, data, and information to an external device and receive various signals, data, and information from the external device. The UE device 100 may be connected to the external device by wire and/or wirelessly. The at least one processor may provide overall control to the UE device 100 and may be configured to compute and process information transmitted to and received from the external device. The memory may store the computed and processed information for a specific time, and may be replaced with a component such as a buffer (not shown). Further, the processor may be configured to perform a UE operation proposed in the present disclosure.

Regarding the configurations of the UE device 100 and the network device 200, the above-described various embodiments of the present disclosure may be applied independently, or two or more embodiments of the present disclosure may be applied at the same time. Redundant description has been omitted for clarity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While various embodiments of the present disclosure have been described in the context of a 3GPP system, the embodiments are applicable in the same manner to various mobile communication systems.

The invention claimed is:

1. A signal transmission and reception method for a session management function (SMF) in a wireless communication system, the method comprising:
   determining, by the SMF, whether a protocol data unit (PDU) session is to be activated; and
   transmitting, by the SMF, a message including a PDU Session Modification Command to an access and mobility management function (AMF),
   wherein the PDU Session Modification Command includes a new Proxy-Call Session Control Function (P-CSCF) list based on a P-CSCF failure, and
   wherein based on the PDU session being related to an Internet Protocol (IP) Multimedia Subsystem (IMS) registration of a User Equipment (UE) via a P-CSCF in the new P-CSCF list, the PDU session is activated.

2. The method of claim 1,
   wherein the message comprises information for the AMF to activate the PDU session, and
   wherein the information is used by the AMF to activate the PDU session.

3. The method of claim 1, wherein based on that the AMF activates the PDU session, the UE receiving the PDU Session Modification Command skips an activation of the PDU session.

4. The method of claim 1, wherein the PDU session is deactivated before the SMF transmits the message including the PDU Session Modification Command.

5. The method of claim 1, wherein the message including the PDU Session Modification Command is a Namf_Communication_NIN2Message Transfer message.

6. The method of claim 1, wherein the PDU Session Modification Command further comprises information for informing that the UE does not need to activate the PDU session.

* * * * *